(12) United States Patent
Bauerle et al.

(10) Patent No.: US 7,997,251 B2
(45) Date of Patent: Aug. 16, 2011

(54) SYSTEMS AND METHODS FOR ELECTRONIC THROTTLE CONTROL

(75) Inventors: Paul A. Bauerle, Fenton, MI (US); Jonathan Packard, Madison Heights, MI (US); Joseph M. Stempnik, Warren, MI (US)

(73) Assignee: GM Global Technology Operations LLC

( * ) Notice: Subject to any disclaimer, the term of this patent is extended or adjusted under 35 U.S.C. 154(b) by 256 days.

(21) Appl. No.: 12/401,021

(22) Filed: Mar. 10, 2009

(65) Prior Publication Data

US 2010/0229828 A1    Sep. 16, 2010

(51) Int. Cl.
*F02D 11/10*    (2006.01)
*F02D 11/00*    (2006.01)

(52) U.S. Cl. .................................. 123/399; 123/395

(58) Field of Classification Search ............. 123/361, 123/399, 395, 396, 198 D; 701/114; 73/114.36, 73/114.32, 1.75
See application file for complete search history.

(56) References Cited

U.S. PATENT DOCUMENTS

| | | | |
|---|---|---|---|
| 2003/0062025 A1* | 4/2003 | Samoto et al. | 123/396 |
| 2003/0183194 A1* | 10/2003 | Noguchi | 123/396 |
| 2005/0235955 A1* | 10/2005 | Katrak et al. | 123/396 |

\* cited by examiner

*Primary Examiner* — Mahmoud Gimie

(57) ABSTRACT

An engine control system includes a status determination module that determines states of first and second throttle position sensors (TPSs), wherein a fault state includes when one of the first and second TPSs is one of outside of a predetermined range and out of correlation with the other of the first and second TPSs, for greater than a first predetermined period. A throttle actuation module opens a throttle when an engine manifold absolute pressure (MAP) is less than a predetermined MAP threshold, at least one of the first and second TPSs is in the fault state, and the other one of the first and second TPSs is within a second predetermined period from transitioning to the fault state.

18 Claims, 3 Drawing Sheets

SYSTEMS AND METHODS FOR ELECTRONIC THROTTLE CONTROL

FIELD

The present disclosure relates to engine control systems and more particularly to systems and methods for electronic throttle control (ETC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel (A/F) mixture within cylinders that drive pistons to produce drive torque. A throttle may be used to regulate airflow into the engine. The throttle may be either mechanically or electronically controlled. Mechanical throttle control systems may include a cable that physically connects an accelerator (e.g. a pedal assembly) to a valve in the throttle. For example, depressing the accelerator may open the throttle valve, allowing air to enter the engine.

Electronic throttle control (ETC) systems may sever the mechanical link between the accelerator and the throttle. For example, ETC systems may determine a required throttle position based on factors such as accelerator pedal position, engine speed, and/or vehicle speed. ETC systems may include an electric motor (i.e. an ETC motor) to control the position of the throttle valve. For example only, the ETC motor may command the throttle valve to the required position as calculated by the ETC system. ETC systems may improve emissions, fuel efficiency, vehicle stability control, and/or vehicle traction control when compared to mechanical throttle control systems.

SUMMARY

An engine control system includes a status determination module and a throttle actuation module. The status determination module determines states of first and second throttle position sensors (TPSs), wherein a fault state includes when one of the first and second TPSs is one of outside of a predetermined range and out of correlation with the other of the first and second TPSs, for greater than a first predetermined period. The throttle actuation module opens a throttle when an engine manifold absolute pressure (MAP) is less than a predetermined MAP threshold, at least one of the first and second TPSs is in the fault state, and the other one of the first and second TPSs is within a second predetermined period from transitioning to the fault state.

A method includes determining states of first and second throttle position sensors (TPSs), wherein a fault state includes when one of the first and second TPSs is one of outside of a predetermined range and out of correlation with the other of the first and second TPSs, for greater than a first predetermined period, and opening a throttle when an engine manifold absolute pressure (MAP) is less than a predetermined MAP threshold, at least one of the first and second TPSs is in the fault state, and the other one of the first and second TPSs is within a second predetermined period from transitioning to the fault state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
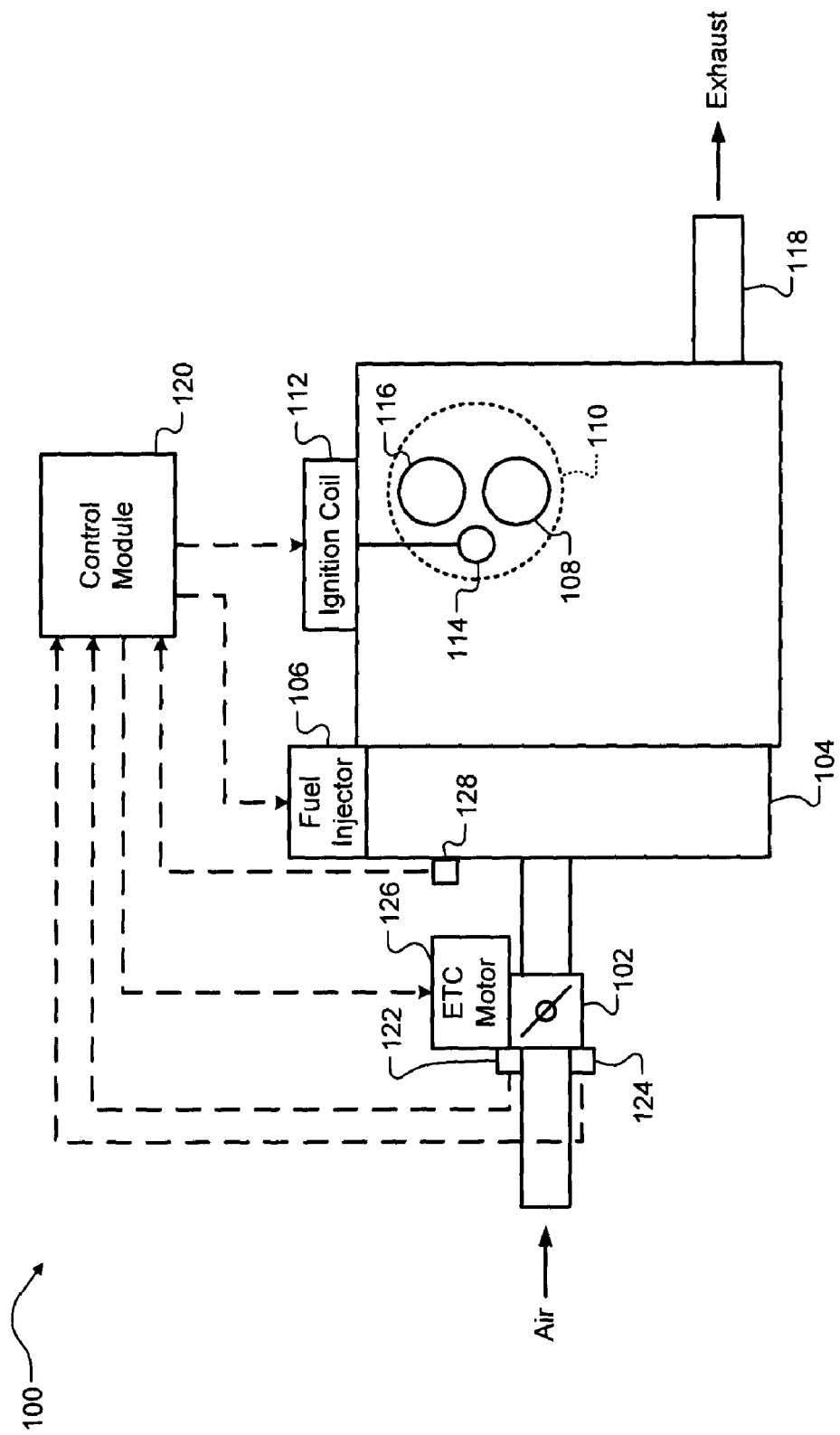
FIG. 1 is a functional block diagram of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typical electronic throttle control (ETC) systems may include a plurality of throttle position sensors (TPSs). For example only, a typical ETC system may include two TPSs. Implementation of a plurality of TPSs may improve system performance, redundancy, and/or safety.

However, because ETC systems rely heavily on sensor feedback, typical ETC systems may malfunction and/or fail due to TPS fault states. For example, when a TPS fault state occurs a typical ETC system may activate a TPS failure mode that commands a default throttle position. The TPS failure mode, hereinafter referred to as "default throttle authority" (DTA), may allow a driver to "limp home" with an engine airflow equivalent to a high-idle condition (e.g. 30% wide-open throttle, or WOT).

During DTA, the ETC system may be disabled and the throttle may return to a default position (e.g. 30% WOT) via throttle return springs. Additionally, engine torque may be controlled via by individual cylinder fuel shut off and/or spark retard.

However, typical ETC systems may stall an engine when the TPSs are in fault states. In other words, incorrect readings from the one or more TPSs may allow an ETC system to accidentally close a throttle blade during engine operation. High engine vacuum levels (i.e. low manifold absolute pressure, or MAP) may then prevent the throttle blade from opening after DTA is commanded, thus causing an engine stall. For example, engine vacuum may be based on a difference between barometric pressure and the MAP.

Therefore, systems and methods are presented for an ETC system that may "uncork" (i.e. pulse open) the throttle blade after TPS fault states are set but before DTA is commanded.

Uncorking the throttle prior to commanding DTA may restore desired engine vacuum levels, and thus may prevent engine stalls.

Referring now to FIG. 1, an engine system 100 is shown. Air is drawn through a throttle valve 102 into an intake manifold 104. An air and fuel (A/F) mixture is created by injecting fuel from a fuel injector 106 into the intake manifold 104. The A/F mixture is drawn through an open intake valve 108 into a representative cylinder 110. An ignition coil 112 activates a spark plug 114 to ignite the A/F mixture within the cylinder 110. After ignition, an open exhaust valve 116 allows the cylinder 110 to vent the products of combustion (i.e. exhaust gases) to an exhaust system 118.

A control module 120 receives signals from throttle position sensors (TPSs) 122 and 124. For example, multiple TPSs 122, 124 may be implemented to improve system performance, redundancy, and/or safety. While two TPSs 122, 124 are shown, more than two TPSs may be implemented. The control module 120 also receives a manifold absolute pressure (MAP) signal from a MAP sensor 128. The MAP sensor 128 measures absolute pressure inside the intake manifold 104.

The control module 120 outputs a throttle control signal to an electronic throttle control (ETC) motor 126, which opens the throttle valve 102. The control module 120 also controls the fuel injector 106 and the ignition coil 112. The control module 120 monitors inputs, such as position of an accelerator pedal (not shown), determines a desired throttle position, and instructs the ETC motor 126 to actuate the throttle valve 102 to the desired throttle position.

The control module 120 may monitor statuses of the TPSs 122, 124. In other words, the control module 120 may monitor the TPSs 122, 124 for error states and/or fault states. For example, a TPS may be set to an error state when a TPS signal is outside of range (OOR). In other words, a TPS may be set to the error state when the TPS generates a TPS signal outside of a predetermined range of positions (e.g. 0 to 5 volts). For example only, a TPS may be OOR due to voltage shorts (high, low, or in-range), open circuits in the TPS, supply, and/or return lines, and more rarely, due to an analog-to-digital (A-D) conversion problems. Additionally, a TPS may be set to an error state when it is out of correlation with the other TPSs.

A TPS may be set to a fault state when the TPS has been in the error state for a predetermined time period. For example only, the predetermined time period may be 200 milliseconds continuously. Additionally, for example only, the TPS may be set to a fault state when the TPS has been in the error state more than 50% intermittently during a 1 second interval.

If a fault state is set, the control module 120 may no longer maintain throttle control electronically. However, the control module 120 may wait for multiple fault states to occur during a trip before commanding DTA. For example only, the control module 120 may command DTA after two fault states are set during a trip.

Before commanding DTA, the control module 120 may determine whether opening (i.e. uncorking) of the throttle is required to prevent an engine stall. For example only, the control module 120 may determine when the MAP is below a MAP threshold (i.e. engine vacuum is above a vacuum threshold) and when both TPSs 122, 124 are set to a fault state. Additionally, for example only, the control module 120 may determine when the MAP is below the MAP threshold (i.e. the engine vacuum is above the vacuum threshold) and when one the TPSs 122, 124 is set to a fault state and the other TPS is set to an error state and is within a predetermined time threshold from being set to a fault state.

The predetermined time threshold corresponds to a delay associated with commanding the ETC motor 126 to open the throttle valve 102. For example only, the delay may be 40 milliseconds. In other words, when the throttle valve 102 is opened too late, an undesirable amount of airflow and torque (i.e. too much power) may be generated, which may cause the driver and/or the vehicle to experience an unwanted and/or unanticipated surge of torque.

Once a TPS has been set to fault state, the fault state remains active for the rest of a driving cycle (i.e. driving trip). The control module 120 may not remove (i.e. heal) the fault state. However, for example only, the fault state may be allowed to self-heal when a scan tool is hooked up and a code clear request is issued by the tool. Furthermore, for example, when the engine is off for more than a predetermined heal time then the fault state may self-heal when the TPS is no longer in an error state. For example only, the predetermined heal time may be five seconds.

When the failure condition is true, the control module 120 may open the throttle prior to commanding DTA to prevent an engine stall. For example only, the throttle opening may be based on a WOT pulse-width modulation (PWM) signal. The opening of the throttle prior to commanding DTA may restore a normal engine vacuum pressure, which may prevent the engine stall.

Figure 2:
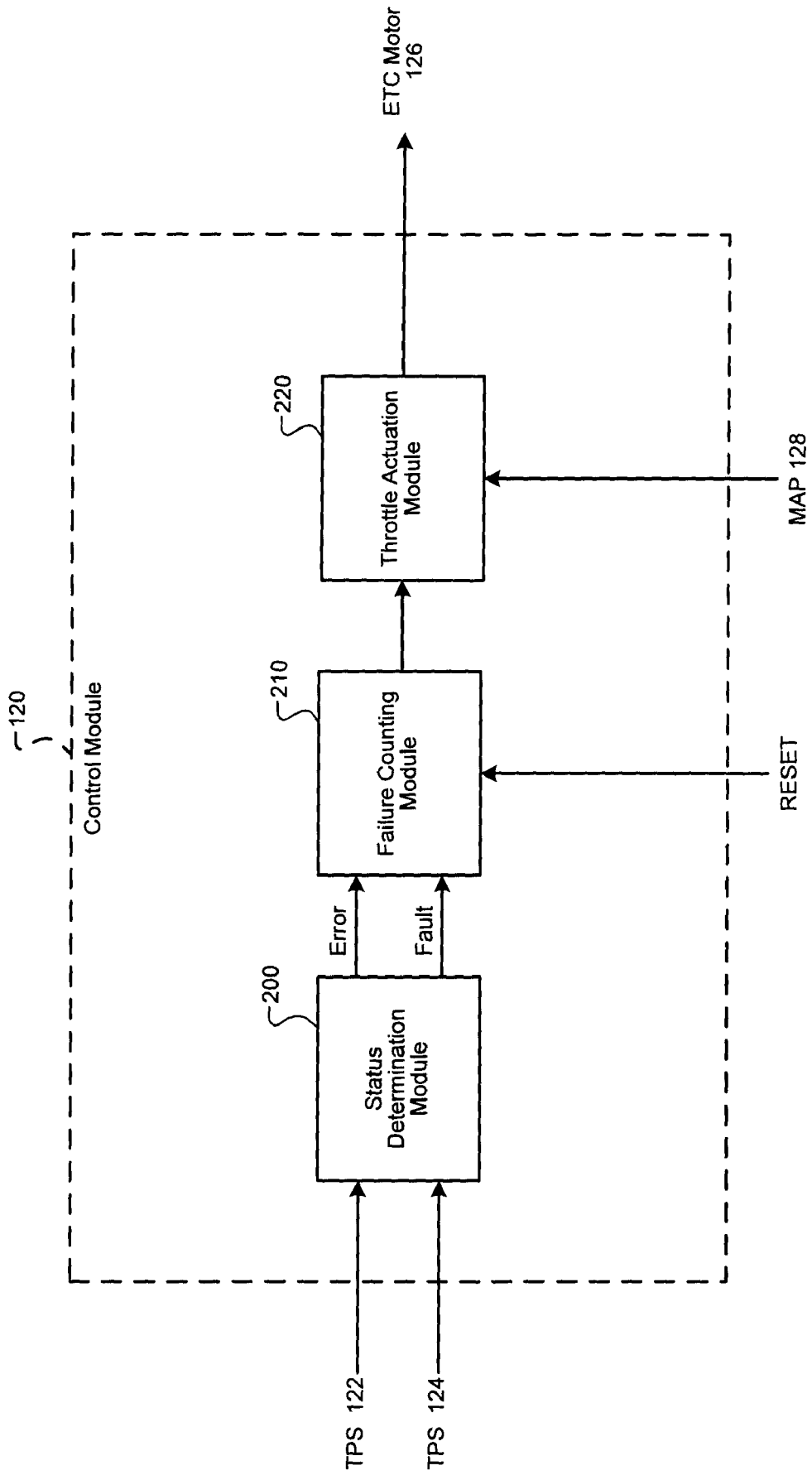
FIG. 2 is a functional block diagram of a control module according to the present disclosure.

Referring now to FIG. 2, the control module 120 is shown in more detail. The control module 120 may include a status determination module 200, a failure counting module 210, and a throttle actuation module 220.

The status determination module 200 receives the signals from the TPSs 122, 124. The status determination module 200 may determine states of the TPSs 122, 124 based on the signals from the TPSs 122, 124. For example only, the status determination module 200 may determine an error state for one of the TPSs 122, 124 when the TPS is OOR. For example only, the status determination module 200 may also determine an error state for one of the TPSs when the TPS is out of correlation with the other TPS.

The status determination module 200 may determine a fault state for one of the TPSs 122, 124 when the TPS has been in an error state for a predetermined time. For example only, the predetermined time may be 200 milliseconds continuously or 50% error intermittently during a 1 second interval.

The failure counting module 210 receives the TPS states from the status determination module 200. The failure counting module 210 may increment a failure count based on a predetermined failure condition. For example only, the predetermined failure condition may be when one TPS in a fault state and one TPS in an error state and within a predetermined time from transitioning to a fault state. The failure counting module 210 may generate an ETC failure signal based on the failure count and a predetermined failure count threshold. For example only, the failure count threshold may be two fault states set during a trip. Additionally, the failure counting module 210 may be reset (e.g. failure count set to zero) via a high RESET signal.

The throttle actuation module 220 may receive the ETC failure signal from the failure counting module 210. The throttle actuation module 220 may generate a throttle actuation signal based on the ETC failure signal, a MAP signal from a MAP sensor, and a predetermined MAP threshold. For example, the throttle actuation module 220 may generate a WOT pulse-width modulation (PWM) signal when the ETC failure signal is high and the MAP is less than the predetermined MAP threshold (i.e. the engine vacuum is greater than the vacuum threshold). For example only, the predetermined MAP threshold may be 50 kPa.

The throttle actuation module 220 may communicate the throttle actuation signal to the ETC motor 126. The ETC motor 126 may open (i.e uncork) the throttle valve 102 based on the throttle actuation signal, which may prevent the engine from stalling. The ETC motor 126 may then be disabled after DTA is commanded.

Figure 3:
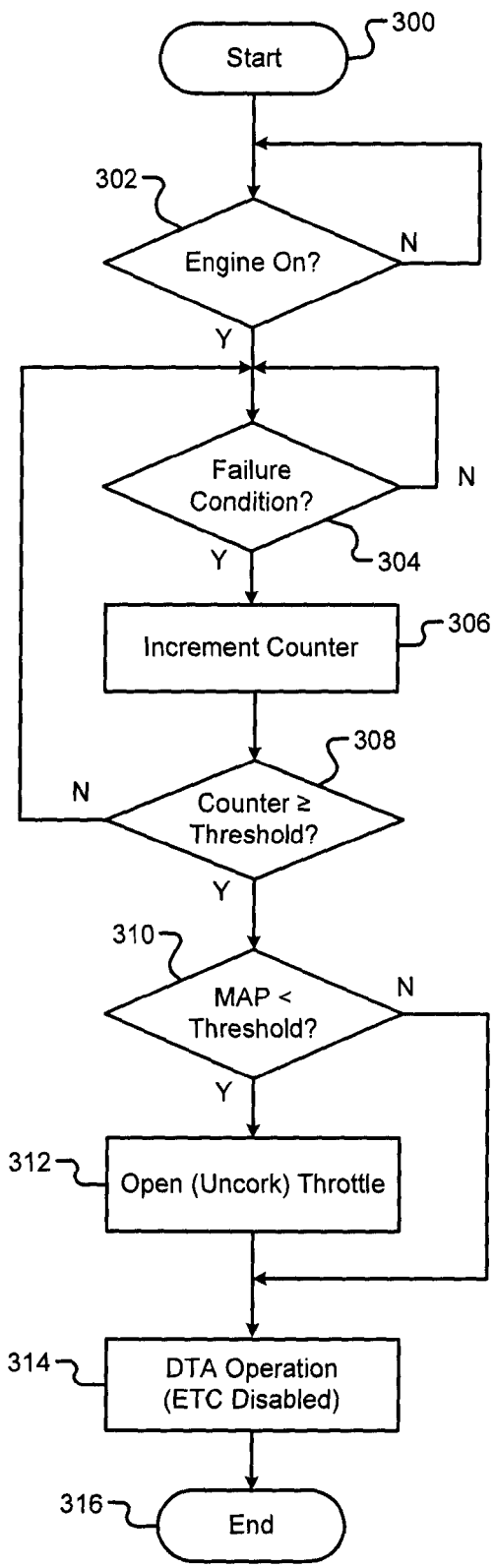
FIG. 3 is a flow diagram of a method of electronic throttle control (ETC) according to the present disclosure.

Referring now to FIG. 3, a flow diagram of a method of operating the ETC system of the present disclosure begins in step 300. In step 302, the control module 120 determines whether the engine is on. If no, control returns to step 302. If yes, control proceeds to step 304.

In step 304, the control module 120 determines whether a failure condition has been met. For example only, a failure condition may be when one TPS is in a fault state and the other TPS is in an error state and is within a predetermined time threshold from transitioning to a fault state. If no, control returns to step 304. If yes, control proceeds to step 306.

In step 306, the control module 120 increments a failure count. In step 308, the control module 120 determines whether the failure count is greater than or equal to a predetermined failure count threshold. For example only, the predetermined failure count threshold may be two. If no, control returns to step 304. If yes, control proceeds to step 310.

In step 310, the control module 120 determines whether the MAP is less than the predetermined MAP threshold (i.e. the engine vacuum is greater than the vacuum threshold). For example only, the predetermined MAP threshold may be 50 kPa. If no, control proceeds to step 314. If yes, control proceeds to step 312. In step 312, the control module 120 opens (i.e. uncorks) the throttle via an ETC motor 126 based on the throttle actuation signal. For example only, the throttle actuation signal may be a WOT pulse-width modulation (PWM) signal.

In step 314, the control module 120 disables the ETC system (i.e. the ETC motor 126) and commands DTA operation. For example only, DTA may include returning the throttle to the default position via throttle return springs. For example only, the default throttle position may be 30% WOT. Control then ends in step 316.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
a status determination module that determines states of first and second throttle position sensors (TPSs), wherein a fault state includes when one of the first and second TPSs is one of outside of a predetermined range and out of correlation with the other of the first and second TPSs, for greater than a first predetermined period;
a throttle actuation module that opens a throttle when an engine manifold absolute pressure (MAP) is less than a predetermined MAP threshold, at least one of the first and second TPSs is in the fault state, and the other one of the first and second TPSs is within a second predetermined period from transitioning to the fault state; and
a failure counting module that increments a failure count when at least one of the first and second TPSs is in the fault state, and the other one of the first and second TPSs is within the second predetermined period from transitioning to the fault state.

2. The engine control system of claim 1, wherein the fault state includes when the one of the first and second TPSs is outside of the predetermined range intermittently for more than a predetermined percentage of a third predetermined period.

3. The engine control system of claim 1, wherein the throttle actuation module opens the throttle when the failure count is greater than or equal to a failure count threshold.

4. The engine control system of claim 3, wherein the failure count threshold is two.

5. The engine control system of claim 1, wherein the throttle actuation module disables an electronic throttle control (ETC) motor after opening the throttle.

6. The engine control system of claim 5, wherein the second predetermined period is based on a delay between commanding the ETC motor and the opening of the throttle.

7. The engine control system of claim 5, wherein the engine control system sets the throttle to a default position after the ETC motor is disabled.

8. The engine control system of claim 7, wherein the default position is 30% wide-open throttle (WOT).

9. The engine control system of claim 1 wherein the throttle actuation module opens the throttle based on a wide-open throttle (WOT), pulse-width modulation (PWM) signal.

10. A method comprising:
determining states of first and second throttle position sensors (TPSs), wherein a fault state includes when one of the first and second TPSs is one of outside of a predetermined range and out of correlation with the other of the first and second TPSs, for greater than a first predetermined period;
opening a throttle when an engine manifold absolute pressure (MAP) is less than a predetermined MAP threshold, at least one of the first and second TPSs is in the fault state, and the other one of the first and second TPSs is within a second predetermined period from transitioning to the fault state; and
incrementing a failure count when at least one of the first and second TPSs is in the fault state, and the other one of the first and second TPSs is within the second predetermined period from transitioning to the fault state.

11. The method of claim 10, wherein the fault state includes when the one of the first and second TPSs is outside of the predetermined range intermittently for more than a predetermined percentage of a third predetermined period.

12. The method of claim 10, further comprising:
opening the throttle when the failure count is greater than or equal to a failure count threshold.

13. The method of claim 12, wherein the failure count threshold is two.

14. The method of claim 10, further comprising:
disabling an electronic throttle control (ETC) motor after opening the throttle.

15. The method of claim 14, wherein the second predetermined period is based on a delay between commanding the ETC motor and the opening of the throttle.

16. The method of claim 14, further comprising:
setting the throttle to a default position after the ETC motor is disabled.

17. The method of claim 16, wherein the default position is 30% wide-open throttle (WOT).

18. The method of claim 10, wherein opening the throttle is based on a wide-open throttle (WOT), pulse-width modulation (PWM) signal.

* * * * *